United States Patent
Namburu et al.

(10) Patent No.: US 11,689,493 B2
(45) Date of Patent: Jun. 27, 2023

(54) CONNECTION TRACKING RECORDS FOR A VERY LARGE SCALE NAT ENGINE

(71) Applicant: VMware, Inc., Palo Alto, CA (US)

(72) Inventors: Maruthi Ram Namburu, Bangalore (IN); Srinivasa Srikanth Podila, Bangalore (IN); Shaik Nazeer, Bangalore (IN); Varun Lakkur Ambaji Rao, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/072,102

(22) Filed: Oct. 16, 2020

(65) Prior Publication Data

US 2022/0006776 A1 Jan. 6, 2022

(30) Foreign Application Priority Data

Jul. 2, 2020 (IN) .......................... IN202041028206

(51) Int. Cl.
*G06F 15/16* (2006.01)
*H04L 61/2503* (2022.01)
(Continued)

(52) U.S. Cl.
CPC .......... *H04L 61/2503* (2013.01); *H04L 45/74* (2013.01); *H04L 47/2441* (2013.01);
(Continued)

(58) Field of Classification Search
CPC ..... H04L 61/2503; H04L 45/74; H04L 69/22; H04L 45/00; H04L 69/00; H04L 61/00
(Continued)

(56) References Cited

U.S. PATENT DOCUMENTS 6,453,357 B1 * 9/2002 Crow ...................... H04L 69/16
710/1
7,042,876 B1 5/2006 Jayasenan et al.
(Continued)

FOREIGN PATENT DOCUMENTS

EP 2495920 A1 9/2012
EP 3780552 A1 * 2/2021 ............. H04L 45/04
(Continued)

OTHER PUBLICATIONS

Identifying network packets across translational boundaries Napoleon Paxton;Joseph Mathews 10th IEEE International Conference on Collaborative Computing: Networking, Applications and Worksharing (Year: 2014).*

(Continued)

*Primary Examiner* — Oscar A Louie
*Assistant Examiner* — Oluwatosin M Gidado
(74) *Attorney, Agent, or Firm* — Adeli LLP

(57) ABSTRACT

Some embodiments provide a novel method for performing network address translation to share a limited number of external source network addresses among a large number of connections. Instead of allocating an external source network address for an egressing packet just based on its internal source network address, the method of some embodiments allocates the external source network address based on the egressing packet's source network address and destination network address. This allows a limited number of external source network addresses to be re-used for different destination network address. For instance, in some embodiments, the method's network address allocation scheme allows the same 64K (e.g., 2^16) external source ports to be used for 64K connections for each destination network address.

17 Claims, 11 Drawing Sheets

(51) Int. Cl.
   *H04L 69/22*      (2022.01)
   *H04L 45/74*      (2022.01)
   *H04L 47/2441*    (2022.01)
   *H04L 47/80*      (2022.01)
   *H04L 61/2514*    (2022.01)
   *H04L 61/2517*    (2022.01)

(52) U.S. Cl.
   CPC .......... *H04L 47/80* (2013.01); *H04L 61/2514* (2013.01); *H04L 61/2517* (2013.01); *H04L 69/22* (2013.01)

(58) Field of Classification Search
   USPC .......................................... 705/245; 709/245
   See application file for complete search history.

(56) References Cited

U.S. PATENT DOCUMENTS

| | | | |
|---|---|---|---|
| 7,647,427 | B1 | 1/2010 | Devarapalli |
| 9,258,271 | B1 | 2/2016 | Anderson |
| 9,331,946 | B2 | 5/2016 | Okita |
| 9,614,761 | B1 | 4/2017 | Kamisetty et al. |
| 9,832,072 | B1 | 11/2017 | Piecuch |
| 9,853,903 | B1 * | 12/2017 | Sharma .................. H04L 45/38 |
| 10,587,571 | B2 * | 3/2020 | Babu ..................... H04L 61/503 |
| 11,115,381 | B1 | 9/2021 | Suri et al. |
| 11,303,609 | B2 | 4/2022 | Namburu et al. |
| 11,316,824 | B1 | 4/2022 | Suri et al. |
| 2003/0081615 | A1 * | 5/2003 | Kohn ..................... G06F 1/3225 370/395.42 |
| 2004/0215752 | A1 | 10/2004 | Satapati et al. |
| 2006/0120366 | A1 | 6/2006 | Jayasenan et al. |
| 2008/0225866 | A1 | 9/2008 | Sehgal et al. |
| 2008/0240132 | A1 | 10/2008 | Sehgal et al. |
| 2010/0061380 | A1 * | 3/2010 | Barach .................. H04L 47/125 370/400 |
| 2010/0254255 | A1 | 10/2010 | Devarapalli |
| 2012/0144043 | A1 | 6/2012 | Huang et al. |
| 2013/0067110 | A1 | 3/2013 | Sarawat et al. |
| 2014/0181286 | A1 | 6/2014 | Jayasenan et al. |
| 2015/0295869 | A1 | 10/2015 | Li et al. |
| 2015/0304275 | A1 | 10/2015 | Ghai et al. |
| 2016/0094631 | A1 | 3/2016 | Jain et al. |
| 2016/0234112 | A1 | 8/2016 | Anand |
| 2017/0004057 | A1 * | 1/2017 | Brown ................ H04L 61/6013 |
| 2017/0359305 | A1 * | 12/2017 | Yin .......................... H04L 45/28 |
| 2018/0034769 | A1 | 2/2018 | Modi et al. |
| 2018/0062923 | A1 * | 3/2018 | Katrekar ............. H04L 63/0272 |
| 2018/0219983 | A1 | 8/2018 | Lambeth et al. |
| 2018/0287996 | A1 * | 10/2018 | Tripathy ............. H04L 61/2514 |
| 2019/0007316 | A1 | 1/2019 | Congdon et al. |
| 2019/0097967 | A1 * | 3/2019 | Xu ........................ H04L 61/255 |
| 2019/0364014 | A1 | 11/2019 | Endou |
| 2019/0379600 | A1 | 12/2019 | Bisht et al. |
| 2020/0304413 | A1 * | 9/2020 | MacCarthaigh .... H04L 47/2441 |
| 2022/0006777 | A1 | 1/2022 | Namburu et al. |

FOREIGN PATENT DOCUMENTS

| | | | | |
|---|---|---|---|---|
| EP | 3790260 | A1 * | 3/2021 | ......... H04L 61/2514 |
| JP | 2014135721 | A | 7/2014 | |
| WO | WO-2006034023 | A2 * | 3/2006 | ......... H04L 49/3063 |
| WO | WO-2011119019 | A1 * | 9/2011 | ............. H04L 69/22 |
| WO | WO-2014073148 | A1 * | 5/2014 | ......... H04L 61/2503 |
| WO | 2022005606 | A1 | 1/2022 | |

OTHER PUBLICATIONS

Flowtracker: A SDN Stateful Firewall Solution with Adaptive Connection Tracking and Minimized Controller Processing Thuy Vinh Tran;Heejune Ahn 2016 International Conference on Software Networking (ICSN) (Year: 2016).*

Header-Translation based Flow Aggregation for Scattered Address Allocating SDNs Ruisi Wu;Wen-Kang Jia;Xufang Wang 2021 IEEE Conference on Dependable and Secure Computing (DSC) Year: 2021 | Conference Paper | Publisher: IEEE (Year: 2021).*

A matching algorithm of Netfilter connection tracking based on IP flow Ke Zhang;Juan Wang;Dasen Ren 2008 2nd International Conference on Anti-counterfeiting, Security and Identification Year: 2008 | Conference Paper | Publisher: IEEE (Year: 2008).*

The impact of host name hashing on name resolution traffic Sebastian Schellenberg; Amirhossein Saliminia; Jochen Seitz; Thomas Finke; Juergen Schroeder 2013 Fifth International Conference on Ubiquitous and Future Networks (ICUFN) (Year: 2013).*

Non-Published Commonly Owned Related U.S. Appl. No. 17/072,109 with similar specification, filed Oct. 16, 2020, 41 pages, VMware, Inc.

Non-Published Commonly Owned Related International Patent Application PCT/US2021/031453 with similar specification, filed May 8, 2021, 41 pages, VMware, Inc.

Penno, R., et al., "Network Address Translation (NAT) Behavioral Requirements Updates," draft-penno-behave-rfc4787-532-5508-bis-04, Jan. 7, 2013, 15 pages, IETF Trust.

PCT International Search Report and Written Opinion of Commonly Owned International Patent Application PCT/US2021/031453, dated Aug. 23, 2021, 18 pages, International Searching Authority (EPO).

* cited by examiner

Pre-allocated Port Groups at Time T=1

Pre-allocated Port Groups at Time T=2

Pre-allocated Port Groups at Time T=3

CONNECTION TRACKING RECORDS FOR A VERY LARGE SCALE NAT ENGINE

BACKGROUND

Datacenters and other private or public networks with internal addressing schemes often have large numbers of machines and processes on those machines that require connections to the Internet or other outside networks. Communications on the Internet often take the form of packets with source addresses and destination addresses that each include an IP address (often an IP4 address) and a port number. There are a limited number of available IP4 addresses (external source IP addresses), so a datacenter will often have more machines that need connections than IP4 addresses assigned to the datacenter. This problem is partially addressed by network address translation (NAT) systems which assign each outgoing flow of packets, from a machine of the datacenter, a single port of one of the limited number of IP addresses of the datacenter. However, as each IP address only has 64K available ports, a datacenter with a large number of machines, or a large number of processes running on those machines that require outside connections, can exhaust all available ports on the datacenter's external source IP addresses. Therefore, there is a need in the art for a NAT system that provides external source IP addresses and port for a very large number of connections between machines of the datacenter and machines external to the datacenter.

BRIEF SUMMARY

Some embodiments provide a novel method for performing network address translation to share a limited number of external source network addresses among a large number of connections. This method is implemented in some embodiments by a first network (e.g., a private or public datacenter network) that uses the limited number of external source network addresses to communicate with one or more other networks. In some embodiments, a gateway of the first network performs the operations of this method.

Instead of allocating an external source network address for an egressing packet just based on its internal source network address, the method of some embodiments allocates the external source network address based on the egressing packet's source network address and destination network address. This allows a limited number of external source network addresses to be re-used for different destination network addresses. For instance, in some embodiments, the method's network address allocation scheme allows the same 64K (e.g., 2^16) external source ports to be used for 64K connections for each destination network address.

To keep track of the allocated external source network addresses, the method of some embodiments creates connection-tracking records that map allocated external source network addresses to internal source network addresses and external destination network addresses. The method of some embodiments creates a connection-tracking record for an egressing packet flow when it receives the first packet of the flow. The packet includes a header with an internal source address (e.g., an address of a machine or device in the datacenter), and an external destination address (e.g., an address of a machine or device outside of the datacenter).

From a pool of a limited number of external source network addresses, the method allocates an external source network address for the packet flow, replaces the internal source address of the first packet with the allocated external source network address, and forwards the first packet to its destination. The method also creates a connection-tracking record (1) for subsequent packets of the first flow, and (2) for a second packet flow that is received in response to the first packet flow. In some embodiments, this connection-tracking record includes two sub-records: a first sub-record for the forward direction (i.e., for the subsequent packets of the first flow) and a second sub-record for the reverse direction (i.e., for the packets of the second packet flow that is in response to the first packet flow).

The first sub-record maps the combination of the internal source network address and external destination address to the allocated external source network address, in order to translate the source network address of packets in the first flow to the allocated external source network address. The second sub-record maps the combination of the external destination address and the external source network address to the internal source network address, in order to translate the destination addresses of packets in the second flow to the internal source network address. Instead of creating two sub-records for the forward and reverse directions, the method of some embodiments creates only one mapping connection-tracking record, and then uses different portions of this record for the match and action attributes in the forward and reverse directions.

In some embodiments, the connection-tracking record uses both the external destination address and external source network address for mapping to the internal network address because the external source network address is also used as an external source network address for different packet flows to different destination addresses. For instance, as mentioned above, the method of some embodiments uses the same external source IP address along with the same 64K source port range for multiple different destination IP addresses. The method of some embodiments further extends the sharing of the 64K source ports by using this port range not only for different destination IP addresses, but also for different destination port addresses to the same destination IP address. This allows the method to support up to 4,294,967,296 (64K multiplied by 64K) connections for each destination IP address.

The method of some embodiments stores the connection-tracking records in a connection-tracking storage. The method creates a connection-tracking record by generating, from a set of header values in the packet header of a packet flow, a hash value that identifies a location in the connection-tracking storage. The method then stores the connection-tracking record at the location in the storage identified by the hash value. Each hash-addressable location in the storage may store a linked list of zero or more connection-tracking records (e.g., may store a pointer to such a list or be a location of an entry of such a list). Each connection-tracking record is associated with a different packet flow to the same destination IP address, and in some embodiments to the same destination port address.

The method of some embodiments creates different connection-tracking data stores for each different destination IP address, and in some embodiments for each different combination of destination IP and port addresses. In such embodiments, the method stores the connection-tracking record for a flow in the connection-tracking data store that is defined for the flow's destination IP address, or destination IP/port address pair. For subsequent packets in the same flow or reverse flow, the method in some embodiments first has to identify the connection-tracking data store that is associated with the flow, before identifying the connection-tracking record for the flow.

Some embodiments provide an efficient method of allocating external source port addresses for the multiple connections that share the limited set of external source IP addresses for a destination IP address, or destination IP/port address pair, outside of a network. For instance, in some embodiments, the method specifies multiple pre-allocated port groups, each with multiple external port addresses. The port addresses are each port addresses corresponding to the same external source network IP address. When external port addresses are available in the pre-allocated port groups, the method allocates external port addresses from the pre-allocated port groups for new connections to the destination IP address. The method also dynamically modifies the number of pre-allocated port groups as the number of connections to destinations outside of the network increases or decreases. Each pre-allocated group may include several source port addresses and these source port addresses may be contiguous in a particular group. In some embodiments, the method performs these operations in order to provide a fast and efficient mechanism for (i) tracking source port addresses assigned to connections to the destination IP address, and (ii) allocating new source port addresses when no previously pre-allocated source port addresses are available.

As the number of connections to a particular destination address rises, the pre-allocated port groups may assign all of their available ports. In order to assign new ports, the method dynamically modifies the number of pre-allocated port groups by identifying a new connection for which an external source port has to be assigned, determining that the existing set of pre-allocated port groups does not have an external source port address available to assign to the new connection, and specifying a new set of pre-allocated port groups. The method then allocates an external port address from the new set of pre-allocated port groups.

In some embodiments, dynamically modifying the number of groups may include reducing the number of groups. The method may reduce the number of groups by identifying a pre-allocated group that was (i) previously used to assign source port addresses to connections and (ii) has had all of its pre-allocated source ports unassigned for at least some threshold period. The method then removes the identified pre-allocated group from the pre-allocated port groups. Removing the identified pre-allocated group may mean deleting the group, setting the group into an idle state, or otherwise eliminating it from use, at least temporarily.

The method of some embodiments provides an efficient way to search the multiple pre-allocated port groups. In some such methods, each particular pre-allocated group includes a set of metadata. The metadata includes an indicator of a number of ports available in the group for allocating to packet flows and a next port available for allocating to a packet flow. The method modifies the number of available ports and the next-available port in the metadata set of the particular pre-allocated group as ports from the particular group are allocated to packet flows and as ports from the particular group are de-allocated from packet flows that have been terminated.

The method may also determine whether a pre-allocated group has an available port for allocation to a new packet flow by examining the number of available ports in the metadata set of the group. When the number of available ports is zero for a group, the method selects another pre-allocated group from which a port should be selected for the new packet flow. The method of some embodiments also determines whether the set of pre-allocated ports indicates any available ports at all by iteratively examining metadata for each pre-allocated port group. If a metadata for a particular pre-allocated port group indicates an available port, the method identifies that the port is available. However, if the metadata for each pre-allocated port group indicates no ports are available in that pre-allocated port group, the method determines that no port tracked by the present pre-allocated port group is available. In some embodiments, determining from the metadata that no port is available in the present pre-allocated groups of ports causes the method to dynamically increase the number of pre-allocated port groups.

The method of some embodiments defines different sets of pre-allocated port groups, with each set associated with a different external destination IP address. The method identifies, for a new packet flow, the port-group set associated with an external destination IP address stored in a header field of the new flow. The method then allocates, for the new packet flow, an external port address from a particular pre-allocated port group in the identified port-group set. The method may also define, for each external destination IP address, a connection-tracking data store for storing connection-tracking records that map allocated external source port addresses to internal source IP and port addresses within the network. The connection-tracking records are used in performing network address translation on packets of flows exiting or entering the network.

The method of some embodiments allocates a bitmap of available source ports and allocates contiguous blocks of source ports in the bitmap to different pre-allocated groups of ports. The method uses the bitmap to identify the pre-allocated port groups and adjust the number of pre-allocated port groups.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for performing network address translation to share a limited number of external source network addresses among a large number of connections. This method is implemented in some embodiments by a first network (e.g., a private or public datacenter network) that uses the limited number of external source network addresses to communicate with one or more other networks. In some embodiments, a gateway of the first network performs the operations of this method.

Instead of allocating an external source network address for an egressing packet just based on its internal source network address, the method of some embodiments allocates the external source network address based on the egressing packet's source network address and destination network address. This allows a limited number of external source network addresses to be re-used for different destination network address. For instance, in some embodiments, the method's network address allocation scheme allows the same 64K external source ports to be used for 64K connections for each destination network address.

Figure 1:
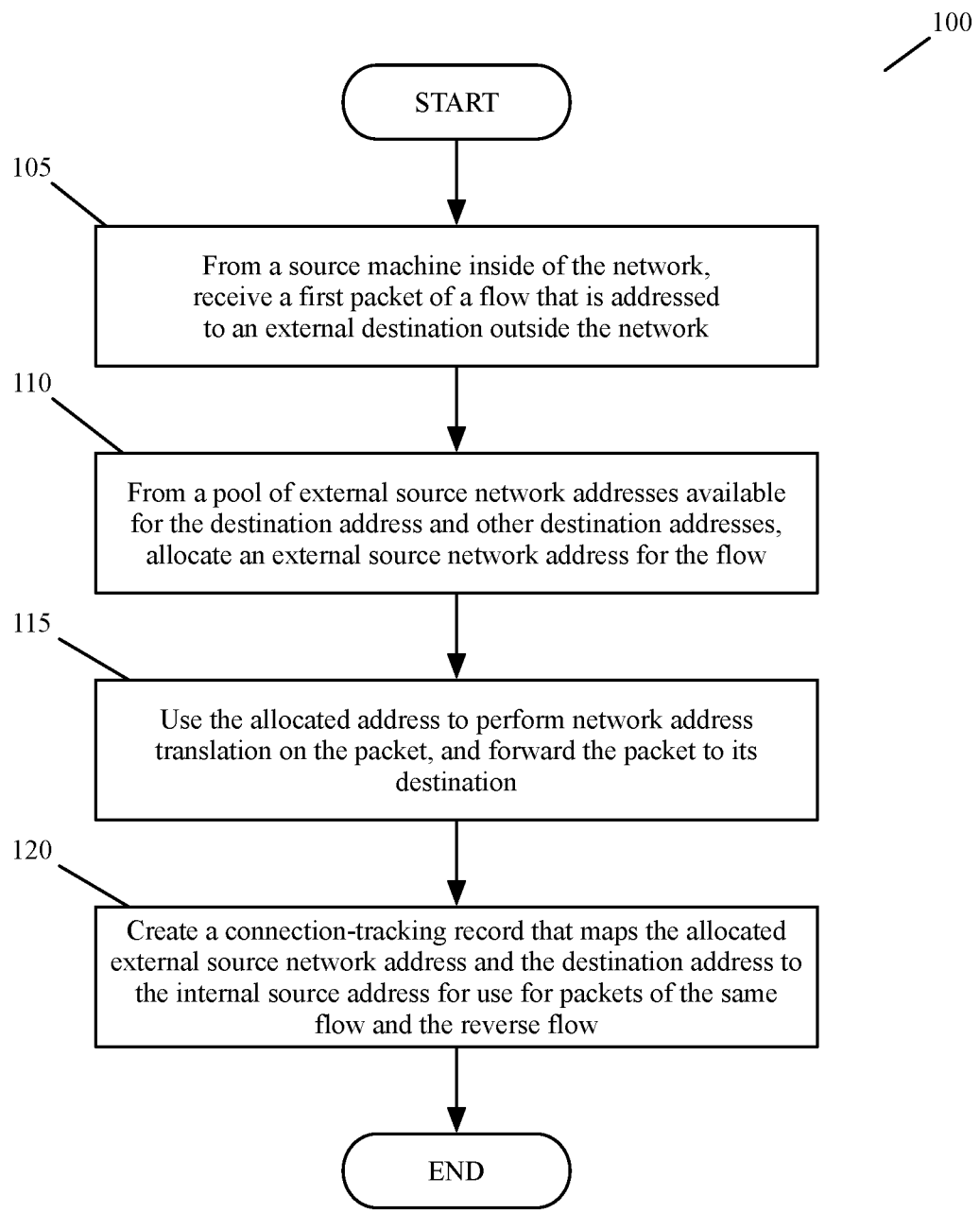
FIG. 1 conceptually illustrates a process of some embodiments that creates a connection-tracking record for a packet flow.

To keep track of the allocated external source network addresses, some embodiments create connection-tracking records that map allocated external source network addresses to internal source network addresses and external destination network addresses. FIG. 1 conceptually illustrates a process 100 of some embodiments that creates such a connection-tracking record for a packet flow. The process 100 creates the connection-tracking record for an egressing packet flow when it receives the first packet of the flow. The packet includes a header with an internal source address (e.g., an address of a machine or device in the datacenter) and an external destination address (e.g., an address of a machine or device outside of the datacenter).

The process 100 receives (at 105) a packet of a packet flow. The packet includes a header with an internal source address and an external destination address. The internal source address is an address of a machine or device in the datacenter. The external destination address is an address of a machine or device outside of the datacenter such as an external website IP address.

From a pool of external source network addresses, the process 100 allocates (at 110) an external source network address for the packet flow. The allocated external source network address will serve as an address on the Internet (or other outside network) to which the destination machine can send reply packets.

The process 100 then uses (at 115) the allocated address to perform network address translation on the packet before forwarding the packet to its destination. The network address translation replaces the internal source address with the allocated external source network address. When the packet reaches its destination, the replaced source address provides the destination machine with a location to which to send reply packets over the Internet or other external network.

For a second packet flow that is received in response to the first packet flow, the process 100 creates (at 120) a connection-tracking record. The connection-tracking record maps the external destination address and the external source network address to the internal source address, in order to translate the destination addresses of packets in the second flow to the internal network address. This mapping allows packets sent in response to the first flow to be routed to the correct machine of the datacenter.

The mapping is used in the method of some embodiments by a network address translator (NAT) to implement an addressing system that determines the internal machine to which an incoming packet is addressed based on both the external source network address that the network uses to communicate with an external machine and the external destination address. This allows the NAT to route packets to the correct internal machine when the external source network address and port are receiving packets from an arbitrarily large number of external machines. That is, the same external source IP and source port address could receive packets from thousands or more different external machines and correctly route the packets to the machines at the appropriate internal network addresses. The NAT uses the connection-tracking records to identify the internal machine for each incoming packet flow.

Figure 2:
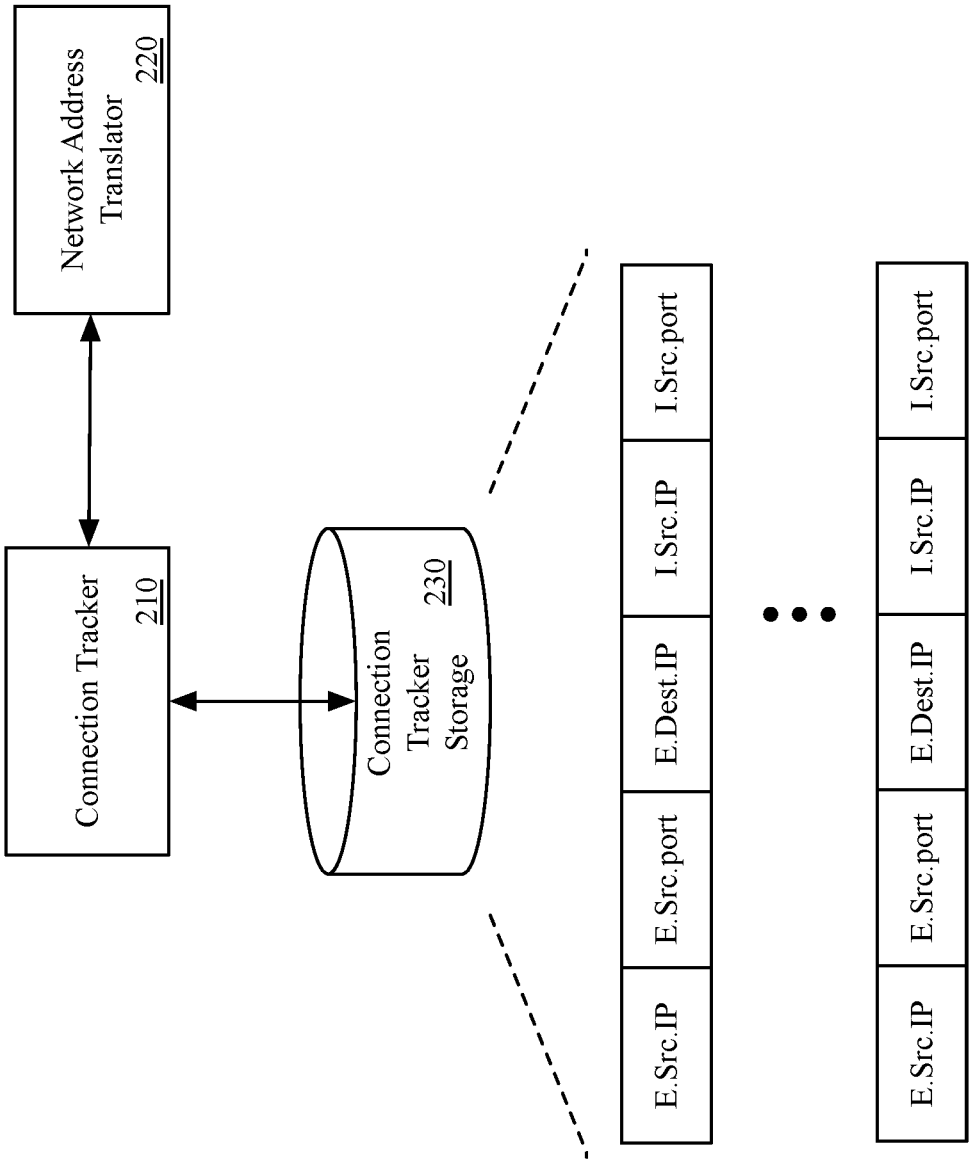
FIG. 2 illustrates a network address translation (NAT) system with a connection tracker.

FIG. 2 illustrates a network address translation (NAT) system with a connection tracker. FIG. 2 includes connection tracker 210, network address translator (NAT) 220, and connection tracker storage 230.

The connection tracker storage 230 includes connection-tracking records used by the NAT 220 to determine which internal addresses to apply to incoming packets and which external source addresses to apply to outgoing packets. In some embodiments, the method creates a single connection-tracking record (1) for packets of a first, outgoing packet flow, and (2) for packets of a second, incoming packet flow that is received in response to the first packet flow.

In FIG. 2, each connection-tracking record in the connection tracker storage 230 includes multiple attributes. The NAT 220 uses these attributes as a set of match attributes and a set of action attributes. In the method of some embodiments, which attributes are used as the match attributes and which are used as action attributes depends on whether the packet to be matched is an incoming or an outgoing packet. For example, for an incoming packet, the match attribute set for each connection-tracking record are external destination IP (E.Dest. IP) and external source network addresses (E.Src.IP and E.Src.port), while the action attributes are internal source addresses (I.Src.IP and I. Src.port).

The network address translator 220 identifies the source and destination addresses for a header of an incoming packet received at the network and uses the connection tracker 210 to determine whether the source and destination addresses in the header match the (incoming) match attributes of a connection-tracking record in the connection tracker storage 230. The network address translator 220 then uses the (incoming) action attributes, I.Src.IP and I.Src.port, to replace the destination network address of the reply packet with the internal network address stored by the connection-tracking record. The reply packet is then forwarded to the machine at the internal network IP address and internal network port.

For outgoing packets, the match attributes are (E.Dest.IP) and internal source addresses (I.Src.IP and I.Src.port) while the action attributes are the external source network addresses (E.Src.IP and E.Src.port). The NAT 220 identifies the source and destination addresses for a header of an outgoing packet to be sent from the network. The NAT 220 then uses the connection tracker 210 to determine whether the source and destination addresses in the header match the (outgoing) match attributes of a connection-tracking record in the connection tracker storage 230. The network address translator 220 then uses the (outgoing) action attributes, E.Src.IP and E.Src.port, to replace the destination network address of the outgoing packet with the internal network address stored by the connection-tracking record. The outgoing packet is then forwarded to the external destination. Some embodiments use hash functions to quickly locate connection-tracking records in connection-tracking storages. The use of such hash functions is further described with respect to FIG. 10, below.

The above described method creates only one mapping connection-tracking record, and then uses different portions of this record for the match and action attributes for flows in the forward and reverse directions. However, in some embodiments, the connection-tracking record includes two sub-records, a first sub-record for the forward direction (i.e., for the subsequent packets of the outgoing flow), and a second sub-record for the reverse direction (i.e., for the packets of the incoming packet flow that is in response to the outgoing packet flow). In such embodiments, the first sub-record maps the combination of the internal source network address and external destination address to the allocated external source network address while the second sub-record maps the combination of the external destination address and the external source network address to the internal source network address. In other embodiments two separate connection-tracking records similar to such sub-records are created, one record for outgoing packets of a flow and one for incoming packets of a response flow.

Figure 3:
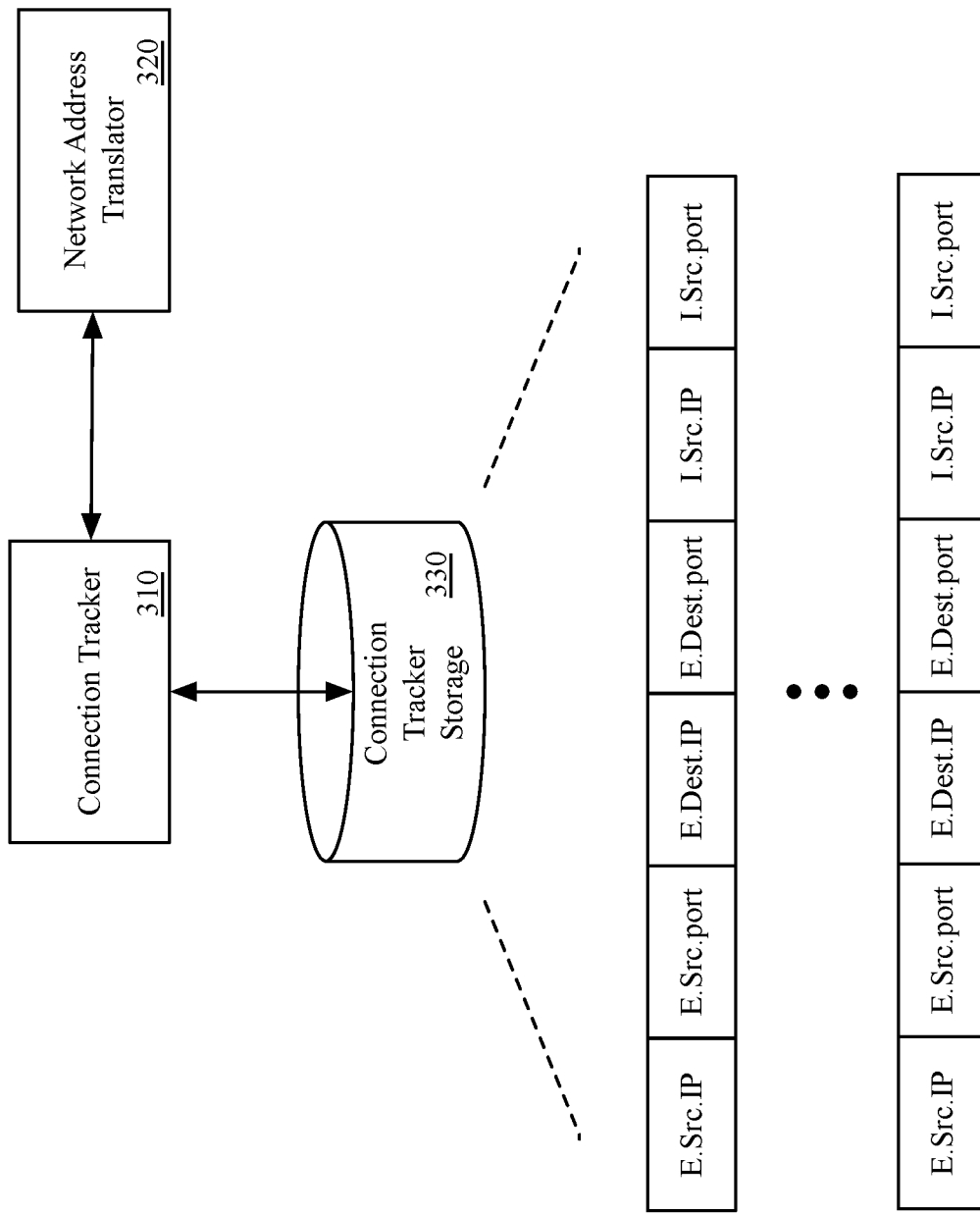
FIG. 3 illustrates a network address translation system with a connection tracker that includes external destination ports in its attributes.

In some embodiments, in addition to the connection-tracking record including the external destination IP, the match attributes also include an external destination port. Such a system allows up to 64K connections for each external destination IP/external destination port pair rather than 64K connections for each external destination IP. FIG. 3 illustrates a network address translation system with a connection tracker 310 that includes external destination ports in its attributes. The network address translator 320 uses a connection tracker 310 to access connection tracker storage 330 in which each connection-tracking record includes, for incoming packets, (1) match attributes: external destination IP (E.Dest.IP), external destination port (E.Dest.port), and external source network addresses (E.Src.IP and E.Src.port), and (2) action attributes: internal source addresses (I.Src.IP and I.Src.port). For outgoing packets, the match attributes are: external destination IP (E.Dest.IP), external destination port (E.Dest.port), and internal source addresses (I.Src.IP and I.Src.port), while the action attributes are: external source network addresses (E.Src.IP and E.Src.port). Some embodiments that include destination port addresses in the connection-tracking records also create two sub-records or two separate connection-tracking records, rather than using a single connection-tracking record and determining which attributes are match or action attributes based on the direction of the packet flow.

In some embodiments, the connection-tracking record uses both the external destination address and external source network address for mapping to the internal network address because the external source network address is used as an external source network address for different packet flows to different destination addresses. For instance, as mentioned above, the method of some embodiments uses the same external source IP address along with the same 64K source port range for multiple different destination IP addresses. The method of some embodiments further extends the sharing of the 64K source ports by using this port range not only for different destination IP addresses but also for different destination port addresses to the same destination IP address. This allows the method to support up to 4,294,967,296 (64K multiplied by 64K) connections for each destination IP address.

Because of the potentially huge number of ports to be allocated for the multiple flows, it is useful to have a fast and efficient method of allocating and de-allocating ports of an external source network address (e.g., an external source IP address). For the sake of efficiency, rather than allocating the 64K ports of an external source IP in a random manner, some embodiments use a source-port allocation process that pre-allocates groups of source port addresses, assigns source port addresses to new connections from these pre-allocated port groups, and adds new and removes old pre-allocated port groups as the number of connections increases and decreases.

Figure 4:
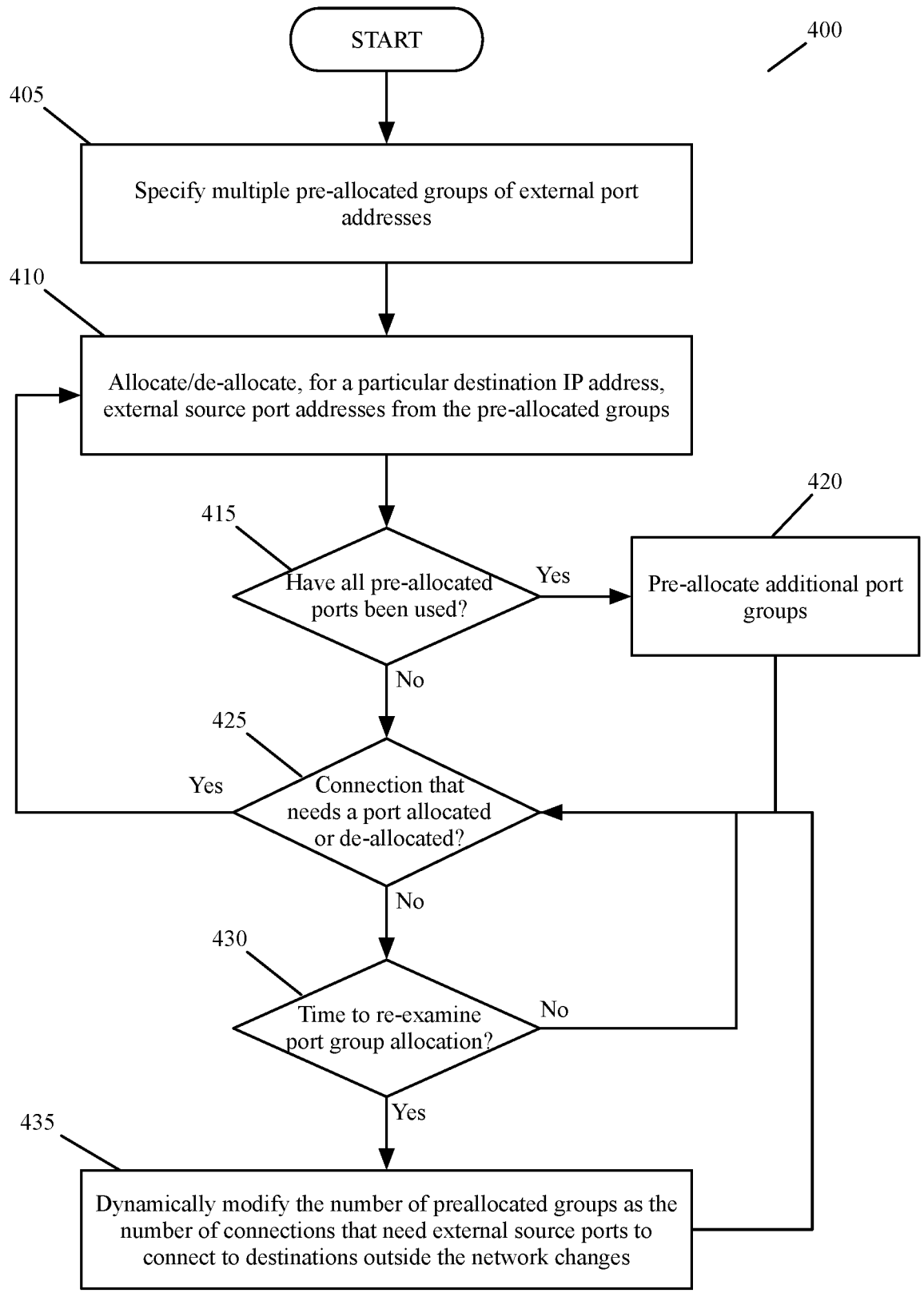
FIG. 4 conceptually illustrates a source-port allocation process of some embodiments.
Figure 5:
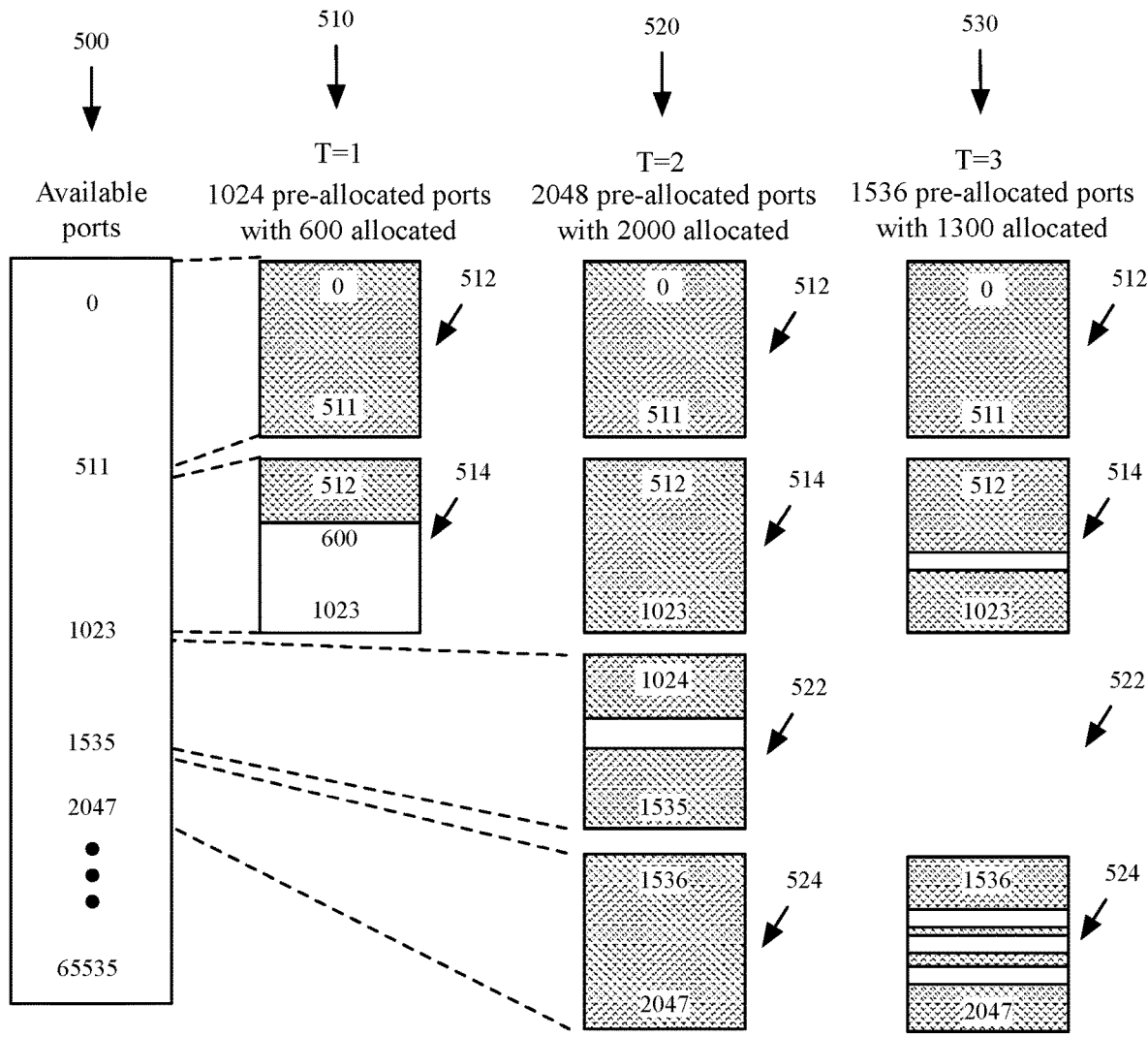
FIG. 5 illustrates pre-allocation of groups of source port addresses.

FIG. 4 conceptually illustrates such a source-port allocation process 400. The process 400 will be described by reference to an example shown in FIG. 5, which illustrates pre-allocation of groups of source port addresses and dynamic growth and reduction of these groups as the number of connections increases and decreases. FIG. 5 includes a column of port addresses 500 of an external source IP address, multiple pre-allocated port groups 510 at time T=1, multiple pre-allocated port groups 520 at time T=2, and multiple pre-allocated port groups 530 at time T=3. The available ports 500 include 65,536 (64K) ports numbered from 0 to 65,535.

The process 400 (of FIG. 4) specifies (at 405) multiple pre-allocated port groups of external port addresses. The port addresses in the pre-allocated port groups are each port addresses of the same external source network address (e.g., of an external source IP address) and are all assigned with respect to the same external destination IP address. In some embodiments, a particular port value is not available to be allocated to a connection unless that port is in a pre-allocated port group. In FIG. 5, at time T=1, the pre-allocated port groups include two groups 512 and 514. Each of these groups contains 512 pre-allocated ports from the set of possible port addresses 500. Within each pre-allocated port group, the source port addresses are contiguous. Group 512 includes ports 0-511 and group 514 includes ports 512-1023.

The process 400 (of FIG. 4) allocates/de-allocates (at 410) external source port addresses from the pre-allocated port groups. Ports are allocated (as needed) between machines of the datacenter and machines at external destination addresses. As FIG. 4 shows, operation 410 is applied repeatedly as new connections are needed.

When the process 400 determines (at 415) that all pre-allocated ports in the pre-allocated port groups have not been used (e.g., some ports are still available in the pre-allocated port groups) the process 400 determines (at 425) whether new connections that need a new port are to be allocated or an existing connection has terminated and the port for that connection needs to be de-allocated. When ports for new connections are being allocated more frequently than ports for old (terminated) connections are being de-allocated, the process 400 will eventually determine (at 415) that all available ports of the pre-allocated groups are in use (e.g., assigned to connections between machines of the datacenter and the external destination address). In that case, the process 400 pre-allocates (at 420) additional port groups, then returns to operation 425.

FIG. 5 illustrates an example of such dynamic modifications of multiple pre-allocated groups 510-530 from time T=1 to time T=3. In this example, 600 external source port addresses in the pre-allocated port groups 512 and 514 have been allocated by time T=1. The pre-allocated group 512 is shown completely shaded to indicate that all 512 ports in group 512 are allocated to various connections between the external source IP address and the particular destination IP address associated with the pre-allocated port groups. Group 514 is partially shaded, with the port number 600 shown as the lowest available port, indicating that group 514 still has available ports 600-1023 to be assigned to new connections.

Between time T=1 and time T=2 the process 400 (of FIG. 4) allocates (at 410) additional external source port addresses from the pre-allocated port group 514 (of FIG. 5) for new connections between the external source IP address and the destination IP address associated with the port groups. At first, each new allocated port address will be one of the available ports in the range 600-1023 from group 514. However, in the illustrated example, the process 400 (of FIG. 4) eventually allocates all the available ports in the pre-allocated port group 514. After that, the process 400 determines (at 415) that all pre-allocated ports in the existing port groups are in use. The process 400 then pre-allocates (at 420) an additional port group, group 522 of FIG. 5. Group 522 also has 512 ports, specifically ports 1024-1535. The process 400 (of FIG. 4) then continues to allocate ports (at 410) until all ports of group 522 (of FIG. 5) are used, then pre-allocates (at 420) additional port group 524, which also has 512 ports, specifically ports 1536-2047.

The process 400 (of FIG. 4), when no connection is being allocated/de-allocated determines (at 430) whether it is time to re-examine port group allocation. In some embodiments, this determination is made periodically (e.g., every 5 seconds, every 10 seconds, etc.). In other embodiments, a state of the system may trigger the re-examination (e.g., the process may re-examine group allocation when the existing pre-allocated ports are nearly all used and/or when all ports of a pre-allocated group have become available either at all or for a threshold amount of time). When the process 400 determines (at 430) that it is not time to re-examine port group allocation, the process 400 returns to operation 425.

When the process 400 determines (at 430) that it is time for a re-examination and the re-examination determines that the number of connections that need external source ports to connect to the external destination address has changed, the process 400 will dynamically modify (at 435) the number of pre-allocated groups, by either increasing or reducing the number of pre-allocated groups. For example, the process 400 (of FIG. 4) reduces (at 435) the number of groups by identifying a pre-allocated port group that is no longer active and removing it after de-allocating (at 410) all of the ports of that pre-allocated port group. Removing the group may mean deleting the group, setting the group into an idle state, or otherwise eliminating it from use. After modifying the number of groups, the process 400 then returns to operation 425 to determine whether connections need to be allocated/de-allocated.

In FIG. 5, sometime between the process adding group 524 and time T=2, connections using ports in group 522 began to terminate. When those connections terminated, the ports became available again and the process 400 de-allocated (at 410) the ports. The newly available ports are shown as the unshaded portion of group 522. In this example, sometime between time T=2 and time T=3, all of the connections in group 522 terminated and the process 400 (of FIG. 4) dynamically modified (at 435) the number of groups by removing (e.g., deleting) group 522 (of FIG. 5). In the illustrated example, some connections using ports tracked by groups 514 and 524 also terminated between T=2 and T=3, as shown by the unshaded portions of those groups. However, since not all connections with ports tracked by either of those groups terminated, the groups 514 and 524 were not removed by process 400.

Although for simplicity of explanation, the description described ports as either only being allocated or only being de-allocated at various times, the process 400 can allocate and de-allocate ports as necessary. For example, the process 400 can allocate a particular port for a new connection after an old connection (to which that port was allocated) terminates. In some embodiments, the method preferentially assigns the lowest available ports to new connections, resulting in a tendency for higher pre-allocated port groups to empty out sooner than lower pre-allocated port groups as overall demand for connections to the destination IP address decreases.

Although the above described figures show operations in a particular order, one of ordinary skill in the art will realize that other orders of operations are within the scope of the invention. For example, in the illustrated embodiment, a new port group is created once the last port of the groups are allocated, but in other embodiments, the new port group may be created when the number of available ports in the pre-allocated groups drops below a threshold, in anticipation of a need for more capacity. In still other embodiments, a new port group may be created only when a new connection needs a port and all available ports are already allocated.

The illustrated groups track port availability only for connections between one particular external source IP and one particular destination IP. Although packets may come in to or be forwarded from the ports of the external source IP from other destination IP addresses, those connections are not tracked by the illustrated pre-allocated port groups of FIG. 5, but rather by separate pre-allocated port groups (not shown). That is, in some embodiments, there is a separate set of pre-allocated port groups for the external source address associated with each destination IP address. Furthermore, in some embodiments, there is a separate set of pre-allocated port groups for the external source address associated with each destination IP address/destination port pair. Although the illustrated pre-allocated port groups are each the same size (contain the same number of ports), in other embodiments, some pre-allocated port groups may be different sizes than others.

The methods of some embodiments provide efficient ways to search the multiple pre-allocated port groups for available ports. In some methods, each pre-allocated port group is associated with a set of metadata. The set of metadata for each group may include an indicator of how many of the ports tracked by that group are available and may also identify a specific available port tracked by that group (e.g., the lowest available port number tracked by the group).

Figure 6:
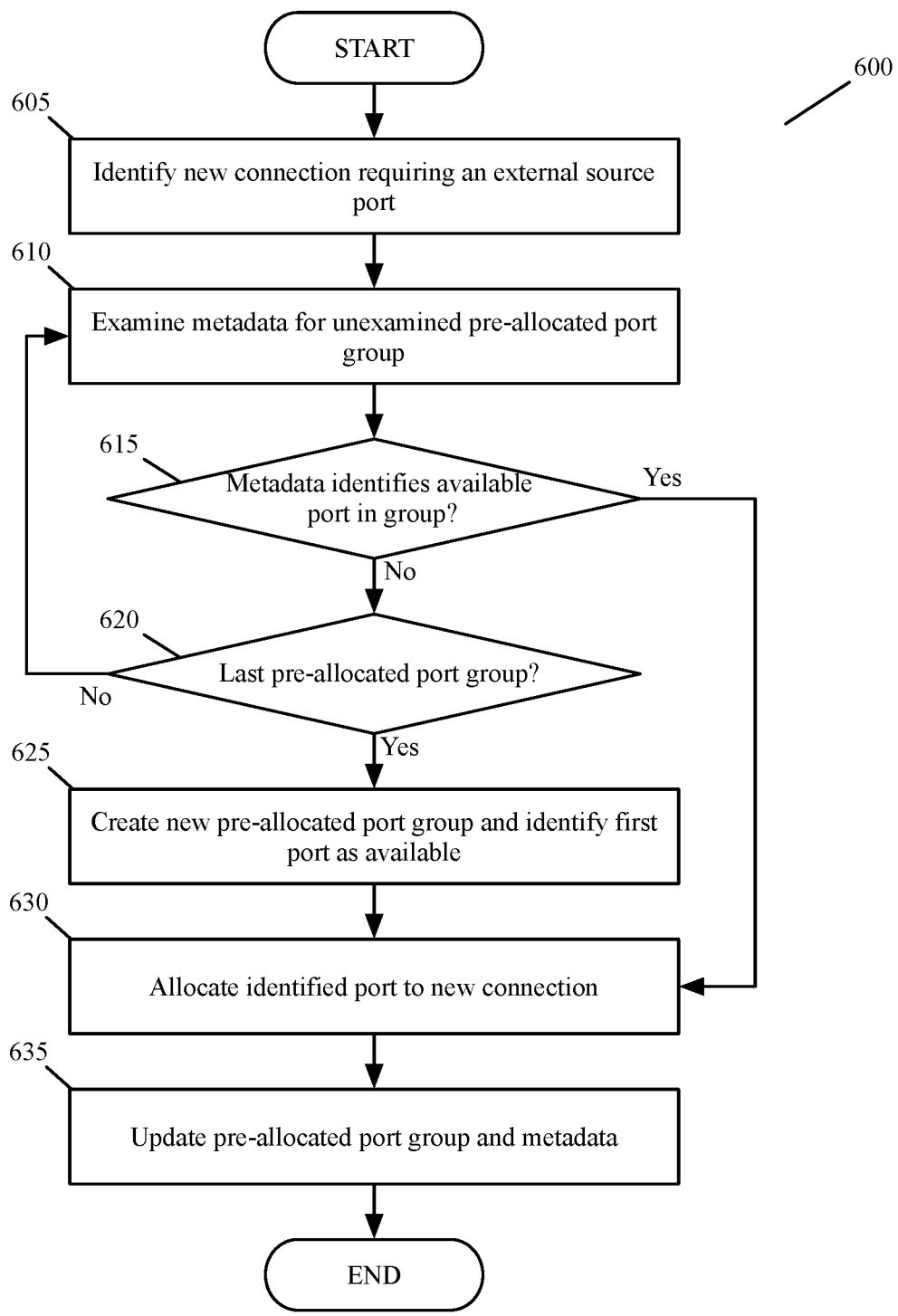
FIG. 6 conceptually illustrates a process of some embodiments to identify and allocate available ports using metadata of pre-allocated port groups.
Figure 7:
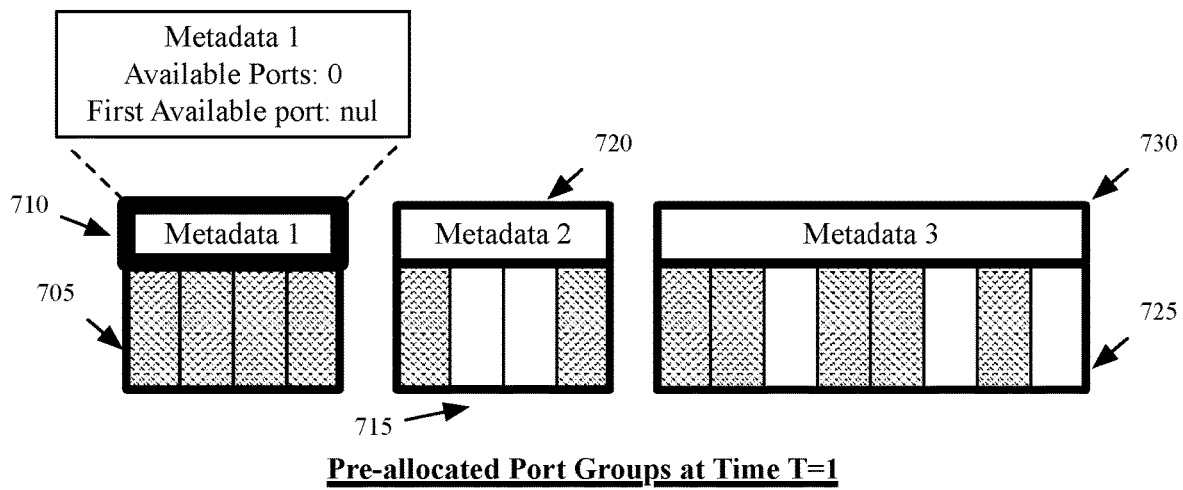
FIG. 7 illustrates iteratively searching metadata of pre-allocated port groups.
Figure 7:
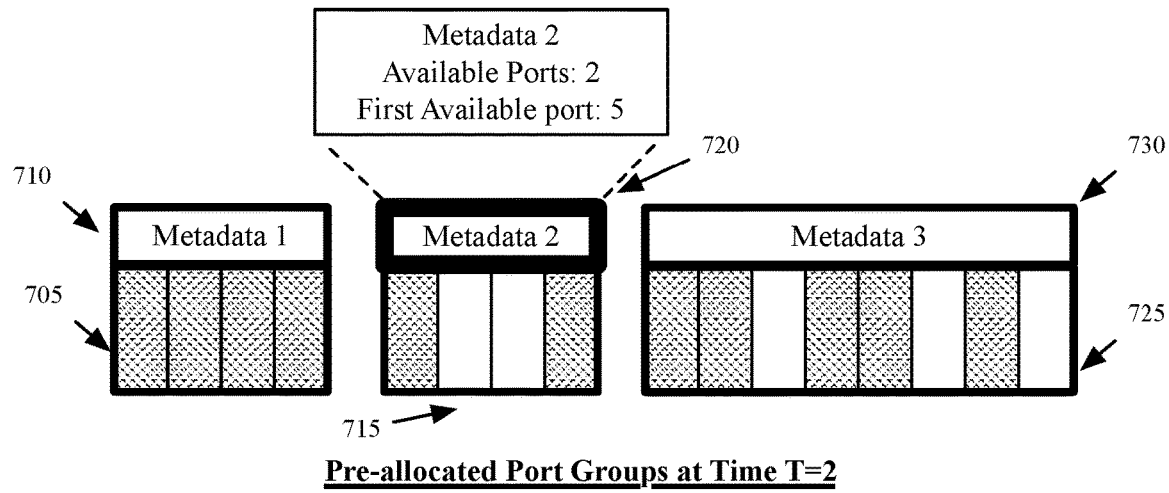
Figure 7:
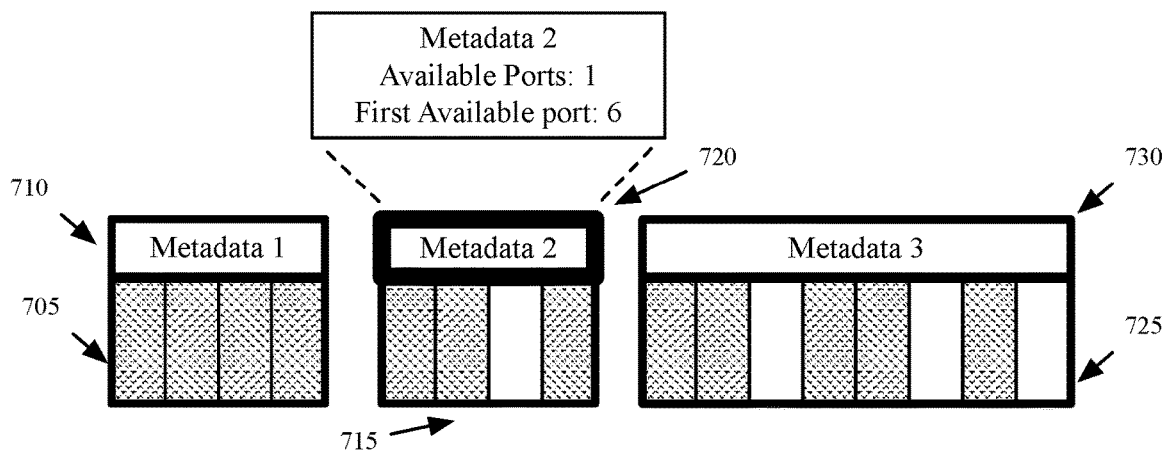

FIG. 6 conceptually illustrates a process 600 of some embodiments to identify and allocate available ports using metadata of pre-allocated port groups. The process 600 uses the metadata to determine whether the existing pre-allocated port groups contain any available ports by iteratively examining metadata for each pre-allocated port group. The process will be described with respect to FIG. 7. FIG. 7 conceptually illustrates iteratively searching metadata of pre-allocated port groups. FIG. 7 includes 3 pre-allocated port groups, specifically two pre-allocated port groups 705 and 715 with four ports each and a pre-allocated port group 725 with eight ports. The groups 705, 715, and 725 each have accompanying metadata 710, 720, and 730, respectively.

The process 600 (of FIG. 6) begins when a new connection requires a port allocation. The process 600 identifies (at 605) a new connection that requires an external source port. The new connection will be a connection between a particular external source IP address and a particular external destination IP address. The pre-allocated port groups to be examined are groups of ports for connections to that particular external destination address.

The process 600 examines (at 610) the metadata for an unexamined (so far in the port allocation process 600) pre-allocated port group. If the process 600 determines (at 615) that the metadata of the first group indicates that no ports are available, the process 600 determines (at 620) whether any other groups have not had their metadata examined and then cycles through operations 610, 615, and 620 until it identifies (at 615) an available port and proceeds to operation 630 (as described in the next paragraph) or determines (at 620) that the metadata of the last group indicates no available ports. If the metadata of every group indicates no available ports, the process 625 creates a new pre-allocated port group and identifies a first port of the new pre-allocated port group as available before proceeding to operation 630.

In the example of FIG. 7 the process 600 starts with the first pre-allocated port group and proceeds sequentially until it finds an available port. The pre-allocated port group 705 has no available ports, as indicated by all four ports of the first pre-allocated port group being shaded. Accordingly, the metadata 710 for group 705 shows no ports available. Therefore, the process 600 (of FIG. 6) determines, at 615, that the metadata identifies no port available in the first group. The process 600 then determines (at 620) that the group was not the last pre-allocated port group, because groups 715 and 725 have not been examined.

The process 600 then examines (at 610) the metadata for the next pre-allocated port group and returns to operation 615 to determine the results. In the example of FIG. 7, the next group is pre-allocated port group 715. Pre-allocated port group 715 has two ports available, as indicated in the figure by two unshaded ports. The metadata 720 indicates that two ports are available in the group and that the next assignable port number is 5. Therefore the process 600 (of FIG. 6) determines (at 615) that port 5 is available. The process 600 (of FIG. 6) then proceeds to operation 630 and allocates port 5 to the new connection.

The process 600 then updates (at 635) the pre-allocated port group to indicate that the port is now allocated and updates the metadata to indicate the remaining number of available ports in the group and the number of the next available port. The process 600 then ends. In FIG. 7, at time T=3, the newly allocated port of group 715 has been shaded to indicate that the port has been allocated and metadata 720 has been updated to indicate only one available port rather than two (as was the case at time T=2) and the next available port is identified in the metadata 720 as port number 6.

The metadata in the illustrated example includes the available port with the lowest numerical value as the next port for allocation. However, in other embodiments some other port of the port group may be designated as the next available port (e.g., the longest unused port, the highest numbered available port, etc.).

As mentioned above, in some embodiments, the connection using an allocated port may terminate. When the connection terminates, the port is de-allocated. The method of some embodiments, updates (1) the pre-allocated port group to which the de-allocated port belongs and (2) the metadata for that group to indicate that the port is available to be allocated to a new connection for a new outgoing flow (and its reply flow). Furthermore, when all the ports in a particular pre-allocated port group are de-allocated, the method of some embodiments removes the pre-allocated port group as well.

Figure 8:
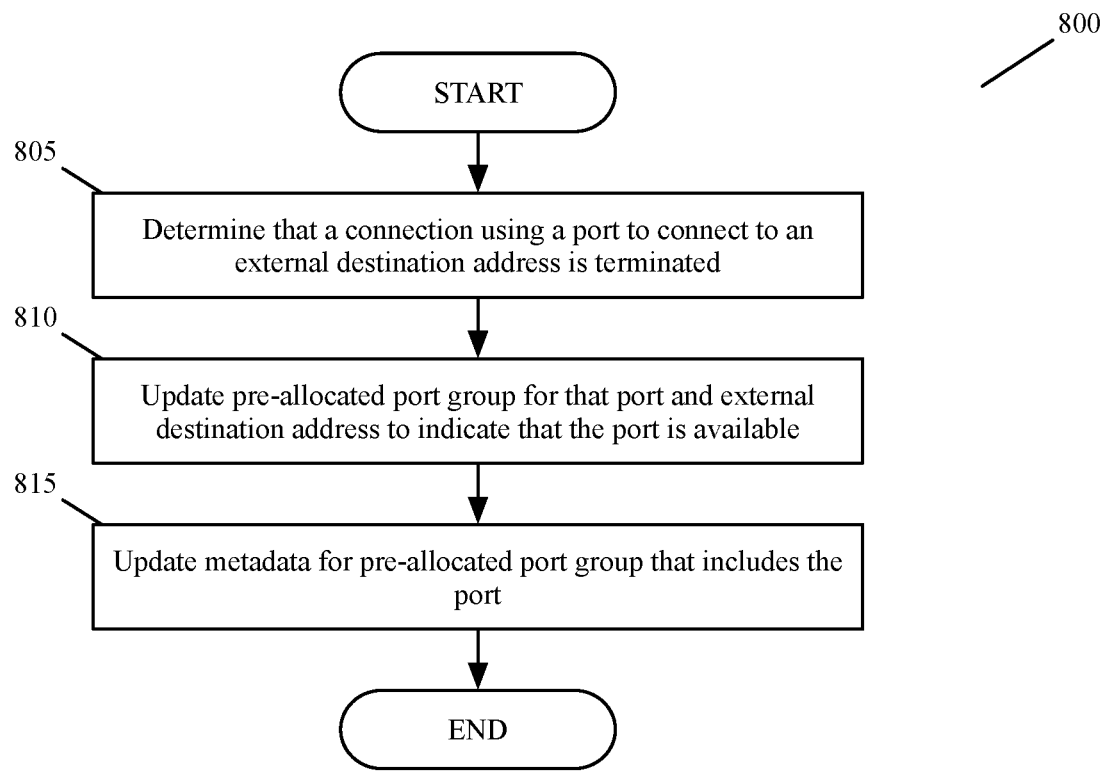
FIG. 8 conceptually illustrates a process of some embodiments for de-allocating ports.
Figure 9:
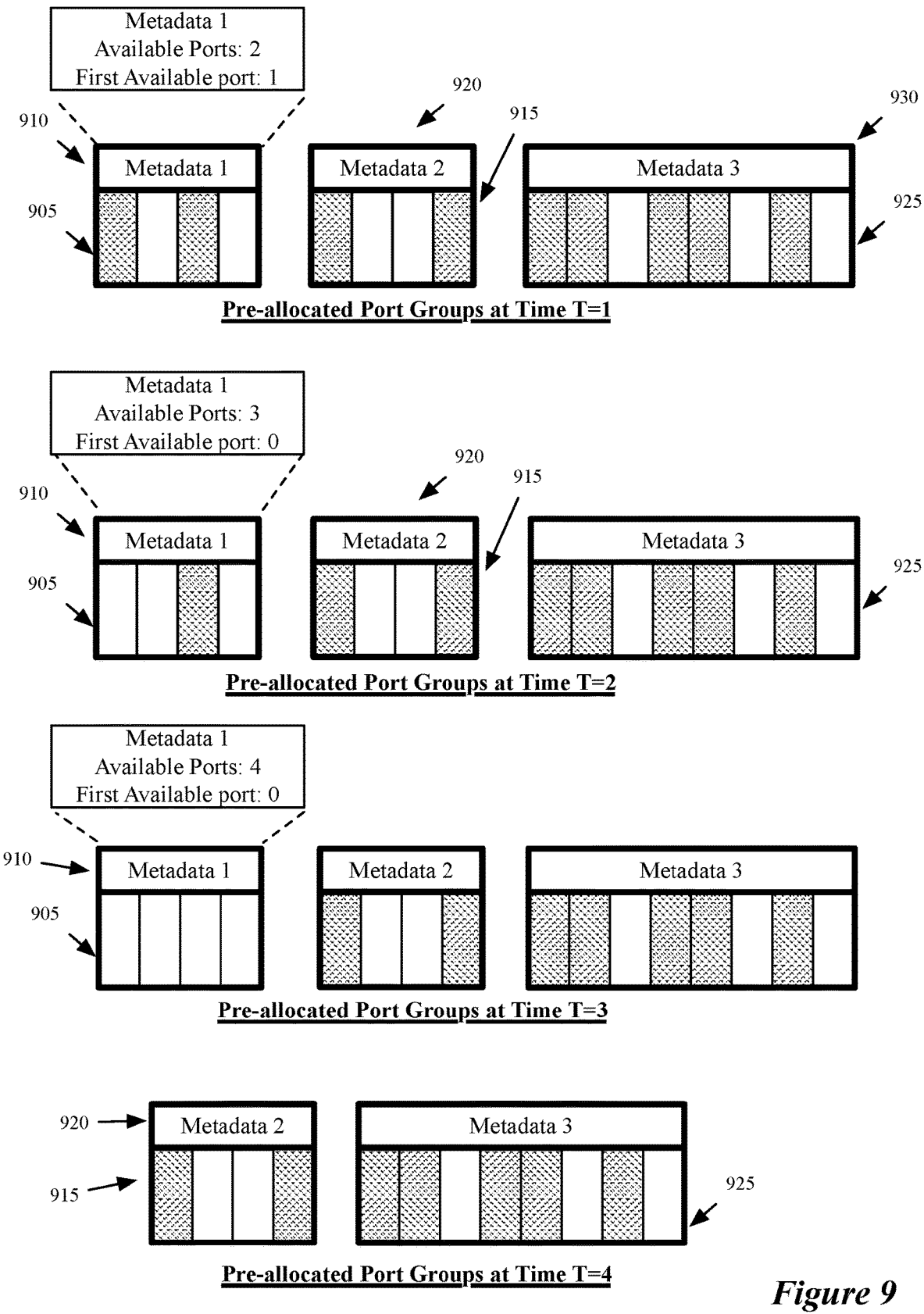
FIG. 9 illustrates modifications of pre-allocated port groups and associated metadata upon the de-allocation of ports.

FIG. 8 illustrates a process 800 for de-allocating ports. The process 800 will be described with reference to FIG. 9. FIG. 9 illustrates modifications of pre-allocated port groups upon the de-allocation of ports. The figure includes pre-allocated groups 905, 915, and 925 with metadata sets 910, 920, and 930 respectively. The figure is shown at times T=1 to T=3 as ports of pre-allocated group 905 are de-allocated and at time T=4 after the process 800 has ended and a separate cleanup process of some embodiments has removed an empty (e.g., with no allocated ports) pre-allocated port group.

The process 800 (of FIG. 8) determines (at 805) that a connection using an external source IP and port to connect to a particular external destination IP address has terminated. In some embodiments, the termination of a connection may be determined by a process that calculates how much time has passed since a packet of an outgoing and/or incoming flow of that connection has been received and identifies the connection as terminated after a threshold time has passed. Additionally or alternatively, a connection may be explicitly terminated by a termination code received from one or both of the machines at the original internal source address and the external destination address.

The process 800 then updates (at 810) the pre-allocated port group for that port in the set of pre-allocated port groups associated with that external destination to indicate that the port is available. Two examples of port-group updating are conceptually illustrated in FIG. 9. At time T=1, the first port of pre-allocated port group 905 is shown by its shading as being allocated to a connection. By time T=2, the first port has been de-allocated, as shown by the lack of shading in the first port of group 905 at time T=2. Similarly, from time T=2 to time T=3, the last remaining allocated port of group 905 is de-allocated, as shown by the removal of its shading.

The process 800 (of FIG. 8) then updates (at 815) the metadata for the pre-allocated port group. In FIG. 9, metadata 910 of group 905 is updated from showing 2 available ports in the associated pre-allocated port group 905 at time T=1 to showing 3 available ports at time T=2. In the illustrated embodiment, the metadata includes the first (lowest port numbered) available port as the next available port for allocation. The first available port identified in the metadata is updated from port 1 at time T=1 to port 0 (the de-allocated port) at time T=2. The metadata 910 is updated again at time T=3 to show 4 available ports in group 905. The process 800 (of FIG. 8) then ends.

In some embodiments, a separate clean-up process (e.g., as discussed with respect to operation 430 and 435 of FIG.

4) removes pre-allocated port groups with no allocated ports. In FIG. 9, group 905 has a remaining allocated port at time T=2, so the group is not removed by such a clean-up process at that time. However, after the last remaining allocated port of group 905 is de-allocated, the group 905 is removed by the clean-up process, leaving only groups 915 and 925 as active pre-allocated groups at time T=4.

One of ordinary skill in the art will understand that in the illustrated embodiments of FIGS. 8 and 9 the process 800 updates the metadata 910 for the empty pre-allocated port group 905 before a separate clean-up process removes the group (e.g., using the metadata to identify the group as empty), while other embodiments may simply remove the group when it becomes empty, without updating the metadata first. Although the metadata in the illustrated example includes the available port with the lowest numerical value as the next port for allocation, in other embodiments some other port of the port group may be designated as the next available port (e.g., the longest unused port, the highest numbered available port, etc.).

In some embodiments, the pre-allocated port groups are stored as bitmap chunks. In such embodiments, each bit of a bitmap chunk represents a single port, with (i) the port number based on the position of the bit within the bitmap and (ii) the state of the port (allocated or not-allocated) determined by the value of the bit. In some such embodiments, as the number of connections to a destination IP grows, larger pre-allocated port groups are allocated (i.e., as larger bitmap chunks). For example, in some embodiments, the first two pre-allocated chunks are implemented as two 512-bit chunks, the next four pre-allocated chunks are implemented as four 1024-bit chunks, the next eight pre-allocated chunks are implemented as eight 2048-bit chunks, and the next eleven pre-allocated chunks are implemented as eleven 4096-bit chunks. In some embodiments, the maximum total number of bits in all the bitmap chunks for a given destination IP address (or destination IP address and port) is 64K. Other embodiments that implement pre-allocated port groups as bitmaps may use different sizes of bitmap chunks to reach 64K bits or may have other maximum numbers of bits (e.g., in order to limit the number of ports available for connections to a particular destination address).

Figure 10:
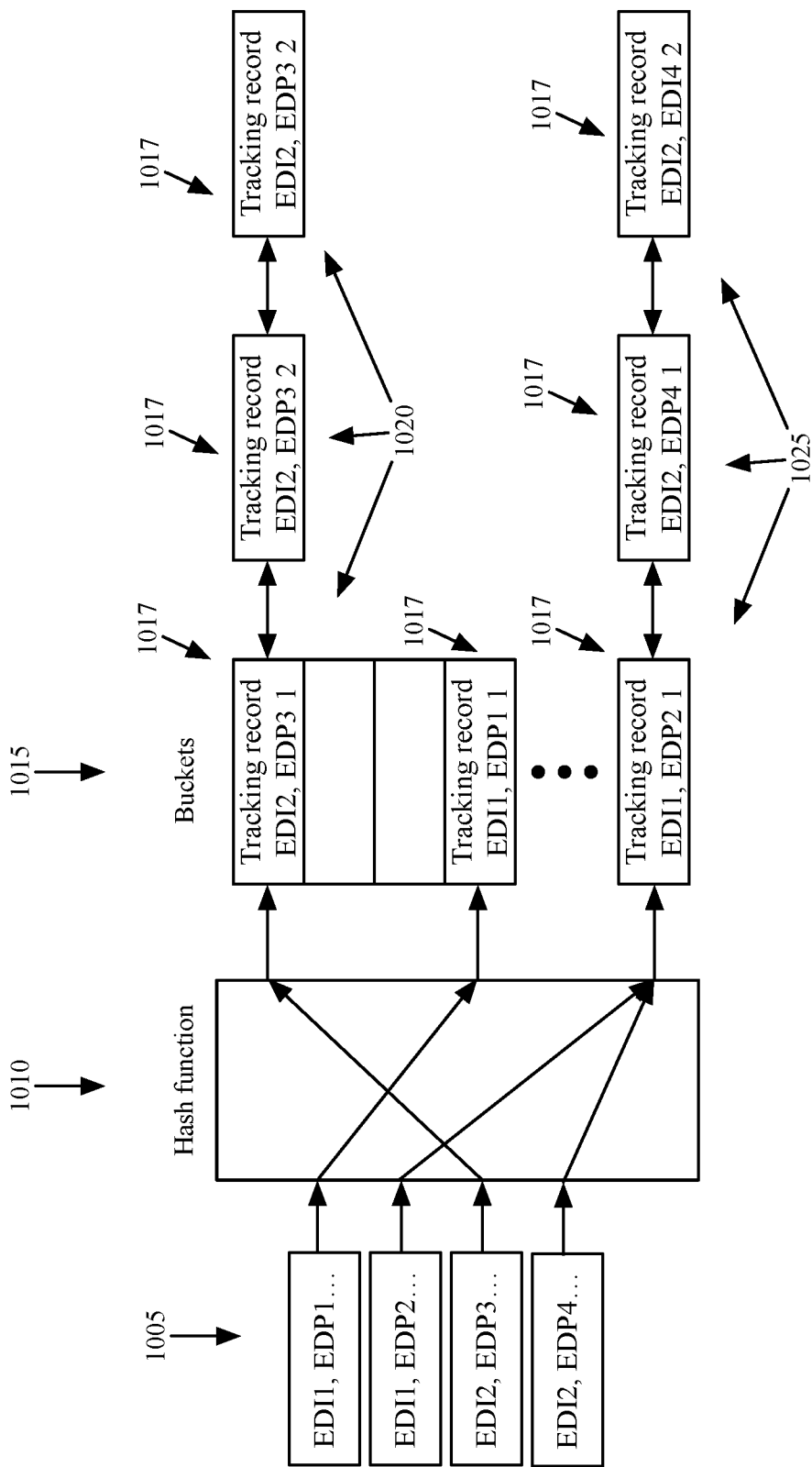
FIG. 10 illustrates the use of a hash function to locate tracking records.

As mentioned above, the method of some embodiments uses hash functions to quickly locate connection-tracking records. FIG. 10 illustrates the use of a hash function to locate tracking-records. The figure includes a set of packet header data 1005, a hash function 1010, and hash buckets 1015 (e.g., rows of a hash table) with tracking record entries 1017. Some of the entries are stored in linked lists 1020 and 1025. One of ordinary skill in the art will understand that although both the data to which the hash function is applied in this figure, and the match and action attributes described with respect to FIGS. 2 and 3, are packet header data, some or all of the packet header data on which the hash is performed may not be the same as any of the match or action attributes.

In the illustrated embodiment of FIG. 10, when a packet comes into the network, the method identifies the external destination IP (EDI) and external destination port (EDP) values from the packet header data 1005. A hash function 1010 is then applied to the EDI/EDP pairs to identify a particular bucket 1015 of a hash table in which the connection-tracking records 1017 are stored.

In some embodiments, hash collisions occur for some flows, such as when multiple connection-tracking records 1017 have the same EDI/EDP pair or when connection-tracking records 1017 of flows with different EDI/EDP pairs hash to the same location. In the event of a hash collision the connection-tracking record entries 1017 are stored in linked lists, such as linked list 1020, which includes three connection-tracking records 1017 from EDI2/EDP3 and linked list 1025 which contains one connection-tracking record 1017 for flows with the EDI1/EDP2 pair and two connection-tracking records 1017 for flows with the EDI2/EDP4 pair.

One of ordinary skill in the art will understand that the methods of some embodiments may use other packet header values as inputs for hash functions. For example, the methods of some embodiments may use the entire connection tuple of a packet or any chosen subset of its values as inputs for a hash function. Some embodiments may use multiple instances of one or more hash functions to populate multiple hash tables with the same general purpose. For example, some embodiments may provide a separate hash table for connection-tracking records for each external source IP address. Similarly, in some embodiments, the methods may use multiple hash functions for different purposes. For example, some embodiments use a hash function to sort entries of a hash table containing connection-tracking records and another hash function to identify where pre-allocation port groups are stored for each ESI/EDI pair or EST/EDI/EDP combination. Additionally, although the illustrated embodiment of FIG. 10 shows connection-tracking records 1017 in the buckets 1015, in some embodiments, the hash function identifies the location in the hash table of a pointer that in turn identifies a first entry in a linked list of connection-tracking records, the location of another hash table, the location of a binary tree, etc.

Figure 11:
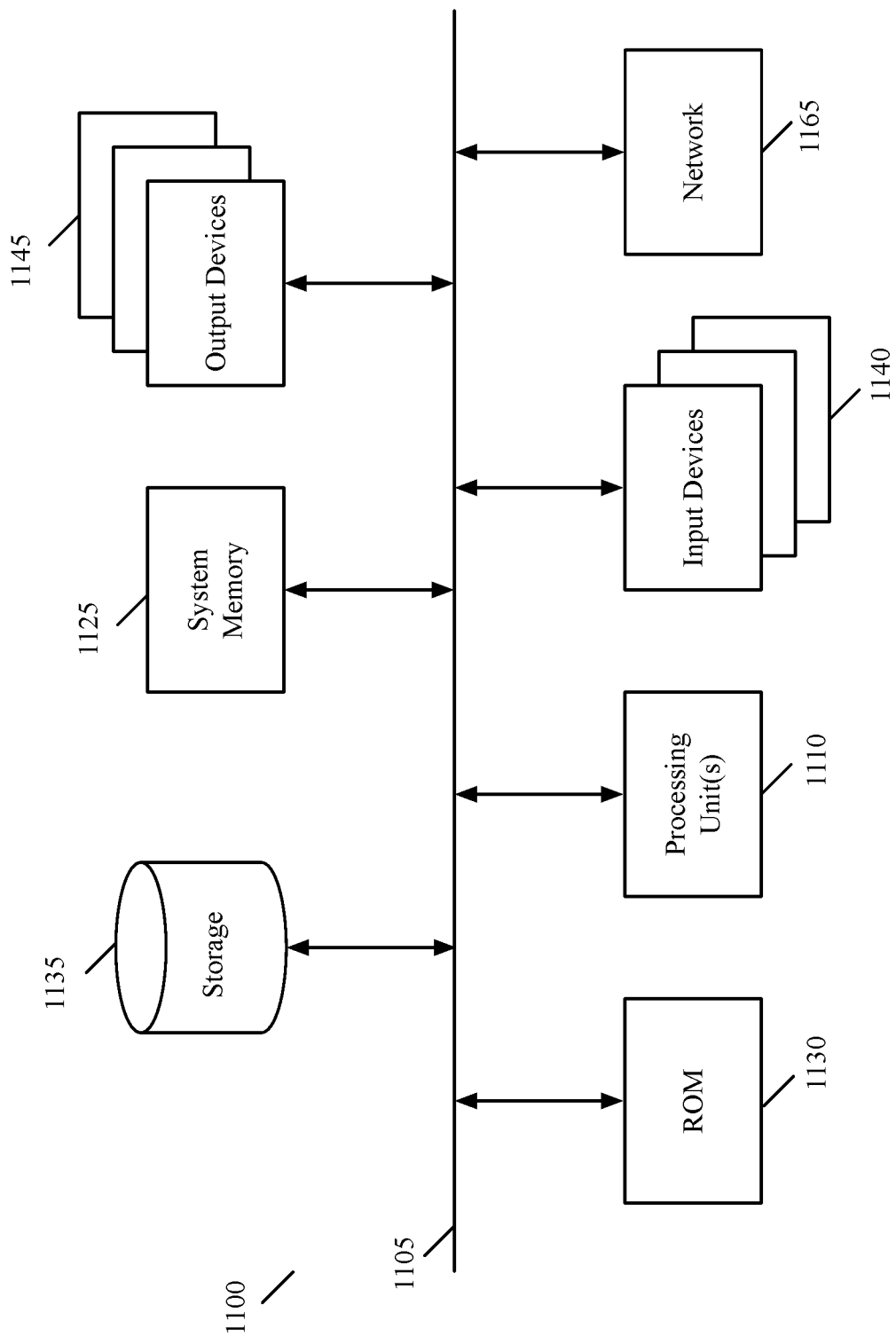
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"). The output devices 1145 display images generated by the electronic system 1100. The output devices 1145 include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of performing network address translation to share a smaller number of external source network addresses among a larger number of connections, the smaller number of external source network addresses used by a first network to communicate with one or more other networks, the method comprising:
receiving a first packet of a first packet flow comprising a header storing a first network address as an internal source address and a second network address as a particular destination address;
from a pool of external source addresses available for the particular destination address, allocating a third network address as an external source address for the first flow, the pool of external source addresses including external source addresses available for packet flows to other destination addresses as well as the particular destination address;
forwarding the received packet after replacing the first network address with the third network address as the source address stored in the header of the packet; and
for a second packet flow that is received in response to the first packet flow, creating a connection-tracking record that is stored in a connection-tracking storage and that maps the second and third network addresses to the first network address, in order to translate the destination addresses of packets in the second packet flow to the first network address,
wherein creating a connection-tracking record comprises (i) generating, from a set of header values in the packet header, a hash value that identifies a location in the connection-tracking storage and (ii) storing the connection-tracking record at the location in the storage identified by the hash value,
wherein each hash-addressable location in the storage stores a linked list of zero or more connection-tracking records, with each connection-tracking record associated with a different packet flow to the destination second network address.

2. The method of claim 1, wherein the connection-tracking record comprises a set of match attributes and a set of action attributes, the match attribute set comprising the second and third network addresses, and the action attribute set comprising the first network address.

3. The method of claim 2, wherein the connection-tracking record further comprises an identifier of a protocol of the packet.

4. The method of claim 1 further comprising:
receiving a first packet of the second flow;
matching destination and source network addresses of the first packet of the second flow to the third and second network addresses stored by the connection-tracking record;
replacing the destination network address of the first packet of the second flow with the first network address stored by the connection-tracking record; and
forwarding the first packet of the second flow to the first network address.

5. The method of claim 4, wherein the first network address identifies a source machine that is a source of the first flow.

6. The method of claim 5, wherein the first network address is associated with a first port address, the second network address is associated with a second port address, and the third network address is associated with a third port address.

7. The method of claim 6, wherein the first port address is a port of the source machine that is the source of the first flow and forwarding the first packet of the second flow to the first network address comprises forwarding the first packet of the second flow to the first address and first port address.

8. The method of claim 1 further comprising allocating, with respect to the third network address, a port associated with the second network address and the first network address.

9. The method of claim 1, wherein the connection-tracking record is stored in a connection-tracking data store that is defined for the second network address as an external destination address, the method further comprising:
based on the second network address, identifying the connection-tracking data store to use for the first packet; and
storing the created connection-tracking record in the identified connection-tracking data store.

10. A non-transitory machine readable medium storing a program which when executed by one or more processing units performs network address translation to share a smaller number of external source network addresses among a larger number of connections, the smaller number of external source network addresses used by a first network to communicate with one or more other networks, the program comprising sets of instructions for:
receiving a first packet of a first packet flow comprising a header storing a first network address as an internal source address and a second network address as a particular destination address;
from a pool of external source addresses available for the particular destination address, allocating a third network address as an external source address for the first flow, the pool of external source addresses including external source addresses available for packet flows to other destination addresses as well as the particular destination address;
forwarding the received packet after replacing the first network address with the third network address as the source address stored in the header of the packet; and
for a second packet flow that is received in response to the first packet flow, creating a connection-tracking record that is stored in a connection-tracking storage and that maps the second and third network addresses to the first network address, in order to translate the destination addresses of packets in the second packet flow to the first network address,
wherein creating a connection-tracking record comprises (i) generating, from a set of header values in the packet header, a hash value that identifies a location in the connection-tracking storage and (ii) storing the connection-tracking record at the location in the storage identified by the hash value,
wherein each hash-addressable location in the storage stores a linked list of zero or more connection-tracking records, with each connection-tracking record associated with a different packet flow to the destination second network address.

11. The non-transitory machine readable medium of claim 10, wherein the connection-tracking record comprises a set of match attributes and a set of action attributes, the match attribute set comprising the second and third network addresses, and the action attribute set comprising the first network address.

12. The non-transitory machine readable medium of claim 10, wherein the program further comprises sets of instructions for:
receiving a first packet of the second flow;
matching the destination and source network addresses of the first packet of the second flow to the third and second network addresses stored by the connection-tracking record;

replacing the destination network address of the first packet of the second flow with the first network address stored by the connection-tracking record; and forwarding the first packet of the second flow to the first network address.

13. The non-transitory machine readable medium of claim 12, wherein the first network address identifies a source machine that is a source of the first flow.

14. The non-transitory machine readable medium of claim 13, wherein the first, second, and third network addresses comprise IP addresses.

15. The non-transitory machine readable medium of claim 14, wherein:

the first network address is associated with a first port address, the second network address is associated with a second port address, and the third network address is associated with a third port address; and the first port address is a port of the source machine that is the source of the first flow and forwarding the first packet of the second flow to the first network address comprises forwarding the first packet of the second flow to the first IP address and first port address.

16. The non-transitory machine readable medium of claim 10 further comprising allocating, with respect to the third network address, a port associated with the second network address and the first network address.

17. The non-transitory machine readable medium of claim 10, wherein the connection-tracking record is stored in a connection-tracking data store that is defined for the second network address as an external destination address, the program further comprising sets of instructions for:

based on the second network address, identifying the connection-tracking data store to use for the first packet; and storing the created connection-tracking record in the identified connection-tracking data store.

* * * * *